(12) United States Patent
Tsutsumi (10) Patent No.: US 9,046,147 B2
(45) Date of Patent: Jun. 2, 2015

(54) LIQUID-FILLED VIBRATION ISOLATING DEVICE

(75) Inventor: Tatsuya Tsutsumi, Yokohama (JP)

(73) Assignee: BRIDGESTONE CORPORATION, Tokyo (JP)

( * ) Notice: Subject to any disclaimer, the term of this patent is extended or adjusted under 35 U.S.C. 154(b) by 175 days.

(21) Appl. No.: 13/514,785

(22) PCT Filed: Oct. 12, 2010

(86) PCT No.: PCT/JP2010/006059
§ 371 (c)(1),
(2), (4) Date: Jul. 17, 2012

(87) PCT Pub. No.: WO2011/070700
PCT Pub. Date: Jun. 16, 2011

(65) Prior Publication Data
US 2012/0306135 A1    Dec. 6, 2012

(30) Foreign Application Priority Data

Dec. 10, 2009 (JP) .................. 2009-280862
Dec. 10, 2009 (JP) .................. 2009-280871

(51) Int. Cl.
*F16F 5/00* (2006.01)
*F16F 13/10* (2006.01)

(52) U.S. Cl.
CPC ............... *F16F 13/10* (2013.01); *F16F 13/106* (2013.01); *F16F 13/105* (2013.01)

(58) Field of Classification Search
USPC ............. 267/140.11, 140.12, 140.14, 140.13, 267/141
See application file for complete search history.

(56) References Cited

U.S. PATENT DOCUMENTS

| | | | | |
|---|---|---|---|---|
| 5,104,100 A * | 4/1992 | Simuttis | ............. | 267/140.13 |
| 5,205,546 A * | 4/1993 | Schisler et al. | .......... | 267/140.13 |
| 5,653,427 A | 8/1997 | Matsuda et al. | | |
| 5,992,833 A * | 11/1999 | Tanahashi | ............... | 267/140.14 |
| 6,631,894 B2 * | 10/2003 | Takashima et al. | ...... | 267/140.14 |
| 6,910,683 B2 * | 6/2005 | Itoh et al. | ................. | 267/140.13 |
| 7,216,857 B2 * | 5/2007 | Yamamoto | ............... | 267/140.13 |
| 7,328,888 B2 | 2/2008 | Sakata | | |
| 7,350,776 B2 | 4/2008 | Muramatsu et al. | | |
| 7,648,129 B2 * | 1/2010 | Muraoka | ................. | 267/140.13 |
| 8,172,209 B2 * | 5/2012 | Muraoka | ................. | 267/140.14 |

(Continued)

FOREIGN PATENT DOCUMENTS

DE    4307148 A1    9/1994
EP    0098330 A1    1/1984

(Continued)

OTHER PUBLICATIONS

Japanese Office Action, dated Aug. 13, 2013, issued in corresponding Japanese Patent Application No. 2009-280862.

(Continued)

*Primary Examiner* — Robert A Siconolfi
*Assistant Examiner* — James Hsiao
(74) *Attorney, Agent, or Firm* — Sughrue Mion, PLLC (57) ABSTRACT

In a liquid-filled vibration isolating device according to a first aspect of the present invention, at least one of a membrane support (11) and a membrane retainer (12) has a through hole (14) partitioned into a plurality of windows by one or more beams (15) each having a curved or deflected shape in a plane perpendicular to the thickness direction of a partition member (9).

6 Claims, 10 Drawing Sheets

(56) References Cited

U.S. PATENT DOCUMENTS

| | | |
|---|---|---|
| 8,308,147 B2 | 11/2012 | Kojima et al. |
| 8,474,799 B2 | 7/2013 | Michiyama et al. |
| 8,678,360 B2 | 3/2014 | Yamamoto et al. |
| 8,807,545 B2 | 8/2014 | Masuda et al. |
| 8,876,094 B1 | 11/2014 | Ridgeway et al. |
| 8,910,926 B2 | 12/2014 | Okamura |
| 2006/0066016 A1* | 3/2006 | Hasegawa et al. ....... 267/140.13 |
| 2006/0091594 A1* | 5/2006 | Miyahara ................. 267/140.13 |
| 2006/0157902 A1* | 7/2006 | Sakata ..................... 267/140.13 |
| 2006/0208405 A1 | 9/2006 | Muramatsu et al. |
| 2006/0267259 A1* | 11/2006 | Hatakeyama et al. ... 267/140.13 |
| 2007/0138718 A1* | 6/2007 | Muraoka ................. 267/140.14 |
| 2008/0023897 A1 | 1/2008 | Muraoka |
| 2008/0060894 A1 | 3/2008 | Koyama et al. |
| 2009/0008845 A1* | 1/2009 | Tanaka et al. ............. 267/64.15 |
| 2010/0072683 A1 | 3/2010 | Saito et al. |

FOREIGN PATENT DOCUMENTS

| | | |
|---|---|---|
| JP | 05-248485 A | 9/1993 |
| JP | 2005-273689 A | 10/2005 |
| JP | 2008-111486 A | 5/2008 |
| JP | 2008-196704 A | 8/2008 |
| WO | 2009022515 A1 | 2/2009 |

OTHER PUBLICATIONS

Japanese Office Action, dated Aug. 13, 2013, issued in corresponding Japanese Patent Application No. 2009-280871.
International Search Report for PCT/JP2010/006059, dated Jan. 18, 2011.
European Search Report dated Mar. 4, 2015 issued in corresponding European Application No. 10835631.2.
Office Action dated Mar. 31, 2015 issued in U.S. Appl. No. 14/276,100.

* cited by examiner

$A_1$–$A_1$ cross section

$A_2$-$A_2$ cross section

$A_4$–$A_4$ cross section

FIG. 8

$A_5-A_5$ cross section

$A_6$-$A_6$ cross section

LIQUID-FILLED VIBRATION ISOLATING DEVICE

CROSS REFERENCE TO RELATED APPLICATION

This application is a National Stage of International Application No. PCT/JP 2010/006059, filed on Oct. 12, 2010, which claims priority from Japanese Patent Application Nos. 2009-280871 and JP 2009-280862, filed on Dec. 10, 2009, the contents of all of which are incorporated herein by reference in their entirety.

TECHNICAL FIELD

The present invention relates to a liquid-filled vibration isolating device, and more particularly to a liquid-filled vibration isolating device for attenuating vibration input to the vibration generating body resulting from such elements as liquid column resonance in a limit passage, a flow resistance applied to the liquid from the limit passage, and a deformation of an elastic member, that occur when a fluid in a primary liquid chamber and in a secondary liquid chamber flows inside the limit passage, while insulating the members on the vibration transmitting body from the vibration. In particular, the present invention relates to a liquid-filled vibration isolating device capable of preventing, for example, changes in high frequency vibration isolation property, generation of abnormal noise due to an elevated liquid pressure, and a breakage of a component forming the partition member, which otherwise result from deformation or the like of the partition member partitioning the primary liquid chamber and the secondary liquid chamber.

RELATED ART

Conventionally, as a vibration isolating device for inhibiting vibration transmission from a member on a vibration generation side, such as an engine, to a member on a vibration transmission side, such as an vehicle body frame, there has been proposed a liquid-filled vibration isolating device, in which a liquid is filled inside the device, as disclosed in JP 2005-273689 A (hereinafter, referred to as Patent Document 1).

That is, Patent Document 1 discloses "a liquid filled type vibration isolation device provided with a first fitting and a cylindrical second fitting, a vibration isolation base body which includes a rubber like elastic material connecting the first fitting and the second fitting, a diaphragm attached to the second fitting to form a liquid filled chamber between the vibration isolation base body, a partition body partitioning the liquid filled chamber to a first liquid chamber on the vibration isolation base body side and a second liquid chamber on the diaphragm side, and an orifice communicating the first liquid chamber and the second liquid chamber, in which the partition body is elastically supported by the second fitting 2 via an elastic body between an inner circumference part of the second fitting and one of grid members on at least one end". This liquid filled type vibration isolation device is "capable of achieving low dynamic spring constant at higher frequency range".

However, the above-mentioned conventional technology involves the following problems. That is, when the partition body is formed of a synthetic resin material in view of providing easiness in workability and reducing weight, the partition member swells with the liquid filled inside the device, which leads a deformation of the grid members, which have the periphery restrained by a rigid member, into a convex shape toward either one of the liquid chambers in the thickness direction of the partition body. As a result, there arise problems that the high frequency vibration isolation property of the device is changed while an elevated liquid pressure leads to generation of an abnormal sound, and even worse, a breakage occurs in the grid members. Further, there has been known that such deformation also occurs when the partition body is subjected to an external force such as swaging force.

DISCLOSURE OF THE INVENTION

Problems to be Solved by the Invention

In view of the above, it is an object of the present invention to provide a liquid-filled vibration isolating device which suppresses displacement of the component forming the partition member resulting from an external force such as a swaging force applied to the partition member partitioning between the primary and secondary liquid chambers and displacement of the component resulting from swelling of the material when the component is formed of a synthetic resin material, to thereby prevent changes in high frequency vibration isolation property, generation of abnormal noise due to an elevated liquid pressure, and a breakage of the member due to the deformation.

Means for Solving the Problem

The inventors have made intensive studies so as to provide a liquid-filled vibration isolating device capable of solving the above-mentioned problems, and have found out that it is effective to design the shape of at least one of the components in the partition member, the components controlling the displacement amount of the elastic partition film (membrane), to thereby bring the present invention to completion.

Therefore, the gist of the present invention for solving the above-mentioned problems is summarized as follows.

A liquid-filled vibration isolating device according to a first aspect of the present invention includes:

a core member to be connected to one of a vibration generating body and a vibration transmitting body;

a cylindrical member connected to the other body;

an elastic member connecting the cylindrical member at one end thereof to the outer periphery of the core member in a fluid-tight manner;

a diaphragm attached to the other end of the cylindrical member in a fluid-tight manner;

a fluid chamber configured as a space defined inside the diaphragm, the space being filled with an incompressible liquid; and a partition member partitioning the fluid chamber into a primary liquid chamber on the core member side and a secondary liquid chamber on the diaphragm side, the partition member having a membrane, a membrane support supporting the membrane, a membrane retainer for restricting, in cooperation with the membrane support, a deformation amount or a displacement amount of the membrane, and a limit passage communicating the primary liquid chamber with the secondary liquid chamber, the membrane support and the membrane retainer each having a through hole penetrating therethrough in a direction toward the primary and secondary liquid chambers, respectively, in which at least one of the membrane support and the membrane retainer has the through hole sectioned into a plurality of windows by one or more beams each having a curved or deflected shape in a plane perpendicular to the thickness direction of the partition member.

In the liquid-filled vibration isolating device according to claim 1, it is more preferred that the at least one of the membrane support and the membrane retainer that has the through hole sectioned into a plurality of windows by one or more beams each having a curved or deflected shape in a plane perpendicular to the thickness direction of the partition member be formed of a synthetic resin.

Here, the above-mentioned synthetic resin is not particularly limited, and may include, for example, Nylon 6 (PA6), Nylon 66 (PA66), polyphenylene sulfide (PPS), and polypropylene (PP).

In the liquid-filled vibration isolating device according to claim 1 or 2, the through hole in which the beams are arranged may preferably be circular in shape.

In the liquid-filled vibration isolating device according to claim 3, it is more preferred that the beams be each curved in an arc-like shape in the plane, and the arc have a curvature radius R which is 0.5 to 2.0 times the radius D/2 of the through hole.

In the liquid-filled vibration isolating device according to any one of claims 1 to 4, the beams each may preferably be configured to have a beam thickness dimension d larger than a beam width dimension W.

In the liquid-filled vibration isolating device according to any one of claims 1 to 5, the plurality of windows defined by the beams may preferably be arranged in a circular symmetric manner in the plane perpendicular to the thickness direction of the partition member.

Here, in the present invention, the term "circular symmetric" refers to a state where a 360-degree rotation of the windows around the center of the through hole includes at least two or more rotational positions where the arrangement of the windows coincides with the arrangement of the windows before the rotation.

A liquid-filled vibration isolating device according to a second aspect of the present invention includes:

a core member to be connected to one of a vibration generating body and a vibration transmitting body;

a cylindrical member to be connected to the other body;

an elastic member connecting the cylindrical member at one end thereof to the outer periphery of the core member in a fluid-tight manner;

a diaphragm attached to the other end of the cylindrical member in a fluid-tight manner;

a fluid chamber configured as a space defined inside the diaphragm, the space being filled with an incompressible liquid; and a partition member partitioning the fluid chamber into a primary liquid chamber on the core member side and a secondary liquid chamber on the diaphragm side, the partition member having a membrane, a membrane support supporting the membrane, a membrane retainer for restricting, in cooperation with the membrane support, a deformation amount or a displacement amount of the membrane, and a limit passage communicating the primary liquid chamber with the secondary liquid chamber, the membrane support and the membrane retainer each having a through hole penetrating therethrough in a direction toward the primary and secondary liquid chambers, respectively, wherein at least one of the membrane support and the membrane retainer has the through hole in which three or more beams extending inside the through hole are arranged, and the beams are each extended from the hole edge of the through hole while avoiding the center of the through hole and connected to the intermediate portion of the other beam adjacent thereto, so that the through hole is sectioned into a plurality of windows.

In the liquid-filled vibration isolating device according to claim 7, it is more preferred that the at least one of the membrane support and the membrane retainer that has the through hole provided with the beams be formed of a synthetic resin.

Here, the above-mentioned synthetic resin is not particularly limited, and may include, for example, Nylon 6 (PA6), Nylon 66 (PA66), polyphenylene sulfide (PPS), and polypropylene (PP).

In the liquid-filled vibration isolating device according to claim 7 or 8, the beams each may preferably be configured to have a beam thickness dimension d larger than a beam width dimension W.

In the liquid-filled vibration isolating device according to any one of claims 7 to 9, the plurality of windows defined by the beams may preferably be arranged in a circular symmetric manner in a plane perpendicular to the thickness direction of the partition member.

Here, in the present invention, the term "circular symmetric" refers to a state where a 360-degree rotation of the windows around the center of the through hole includes at least two or more rotational positions where the arrangement of the windows coincides with the arrangement of the windows before the rotation.

In the liquid-filled vibration isolating device according to any one of claims 7 to 10, the beams each may preferably be formed in a curved or deflected shape in the plane perpendicular to the thickness direction of the partition member.

In the liquid-filled vibration isolating device according to any one of claims 7 to 11, the through hole in which the beams are arranged may preferably be circular in shape.

In the liquid-filled vibration isolating device according to any one of claims 7 to 12, a perpendicular from the center of the through hole to a center line in the width direction of the beam may preferably have a length falling within a range of 2 to 5 times the width dimension W of the beam.

Effect of the Invention

Referring to FIGS. 1(a) and 1(b) illustrating a bottom view and a sectional view of a partition member 9 that can be used for the liquid-filled vibration isolating device according to the first aspect of the present invention, the partition member 9 has a membrane 10, a membrane support 11, a membrane retainer 12, and a limit passage 13. In the illustrated example, the membrane support 11 has a through hole 14 formed therein, and the through hole 14 is sectioned into eight windows 16 by eight beams 15 which are curved in a spiral manner.

Although it is unclear from the drawing, the membrane retainer 12 also has a through hole formed therein which is similar to the above-mentioned through hole, and the through hole is sectioned into four small windows by two linear beams which intersect each other. Here, the membrane 10 is formed of a film-like elastic body such as a rubber film or the like, the membrane support 11 is formed of a synthetic resin material, and the membrane retainer 12 is formed of metal.

Further, in the illustrated example, the through hole 14 has a diameter D of φ44, the beams 15 each have a width W of 1.5 mm, and the beams 15 each have a thickness d of 3 mm. Here, W and d satisfy the relation of W<d.

The liquid-filled vibration isolating device according to the first aspect of the present invention, to which the above-mentioned partition member 9 is applied, is characterized in that the beam 15 provided to the through hole 14 of at least one of the membrane support 11 and the membrane retainer 12 is curved in a plane perpendicular to the thickness direction of the partition member 9 as illustrated in the drawing.

The beam 15 is curved as described above in the plane, so that deformation of the membrane support 11 in the radially inward direction resulting from swaging or swelling can be absorbed through the deformation of the beams 15, without causing any change in variation amount of the membrane 10 in the vertical direction of FIG. 1(b). That is, with this configuration, when the membrane support 11 of the partition member 9 is deformed inward in the radial direction under an external force such as a swaging force or due to swelling with a liquid filled inside the device, each beam 15, which is also subjected to a force in a compressing direction, undergoes deflection deformation in a plane perpendicular to the thickness direction thereof without being deflected in the thickness direction because each beam 15 is configured as a curved shape. As a result, the spacing between each of the beams 15 and the membrane 10 is always kept constant.

In the illustrated example, each beam 15 has a deflection $\delta_\theta$ in the circumferential direction in which the degree of deflection about the central axis of the partition member 9 increases. This configuration causes no change in variation amount of the membrane 10 relative to a high frequency vibration input, with the result that the vibration isolation property of the device can be prevented from being changed.

That is, according to the first aspect of the present invention, there can be provided a liquid-filled vibration isolating device capable of preventing deficiencies such as changes in high frequency vibration isolation property, generation of abnormal noise due to an elevated liquid pressure, and a breakage of a component forming the partition member, which otherwise result from an external force such as a swaging force applied to components used for the partition member.

Further, in the vibration isolating device according to the first aspect of the present invention, in view of workability, at least one of the membrane support 11 and the membrane retainer 12 that has the through hole 14 sectioned into a plurality of windows 16 by one or more beams each having a curved or deflected shape in a plane perpendicular to the thickness direction of the partition member 9 may be formed of a synthetic resin. In this case, the configuration of the present invention is also capable of preventing displacement due to swelling of the component formed of a synthetic resin, to thereby ensure workability without impairing vibration isolation property of the device.

Further, the first aspect of the present invention can be suitably applied to a case where the through hole 14 in which the beams 15 are arranged is circular in shape as in the illustrated example. With the through hole 14 being circular in shape, the hole edge of the through hole 14 is likely to be uniformly displaced in the diameter reducing direction when the partition member 9 is deformed, and hence, for example, the windows 16 can be prevented from undergoing non-uniform change in area before and after the deformation, with the result that changes in vibration isolation property resulting from the non-uniform change in area of the windows 16 can be effectively suppressed.

Further, in the vibration isolating device according to the first aspect of the present invention, when the through hole 14 in which the beams 15 are arranged is formed circular in shape, it is preferred that the beams 15 each be curved in an arc-like shape and the arc has a curvature radius R which is 0.5 to 2.0 times the radius D/2 of the through hole 14. With the curvature radius R being larger than 0.5 times the radius D/2 of the through hole 14, durability of the beams can be sufficiently ensured. On the other hand, with the curvature radius R being smaller than 2.0 times the radius D/2 of the through hole 14, an effect of the present invention of absorbing a force applied to the component in the radially inward direction can be sufficiently attained.

Figure 3:
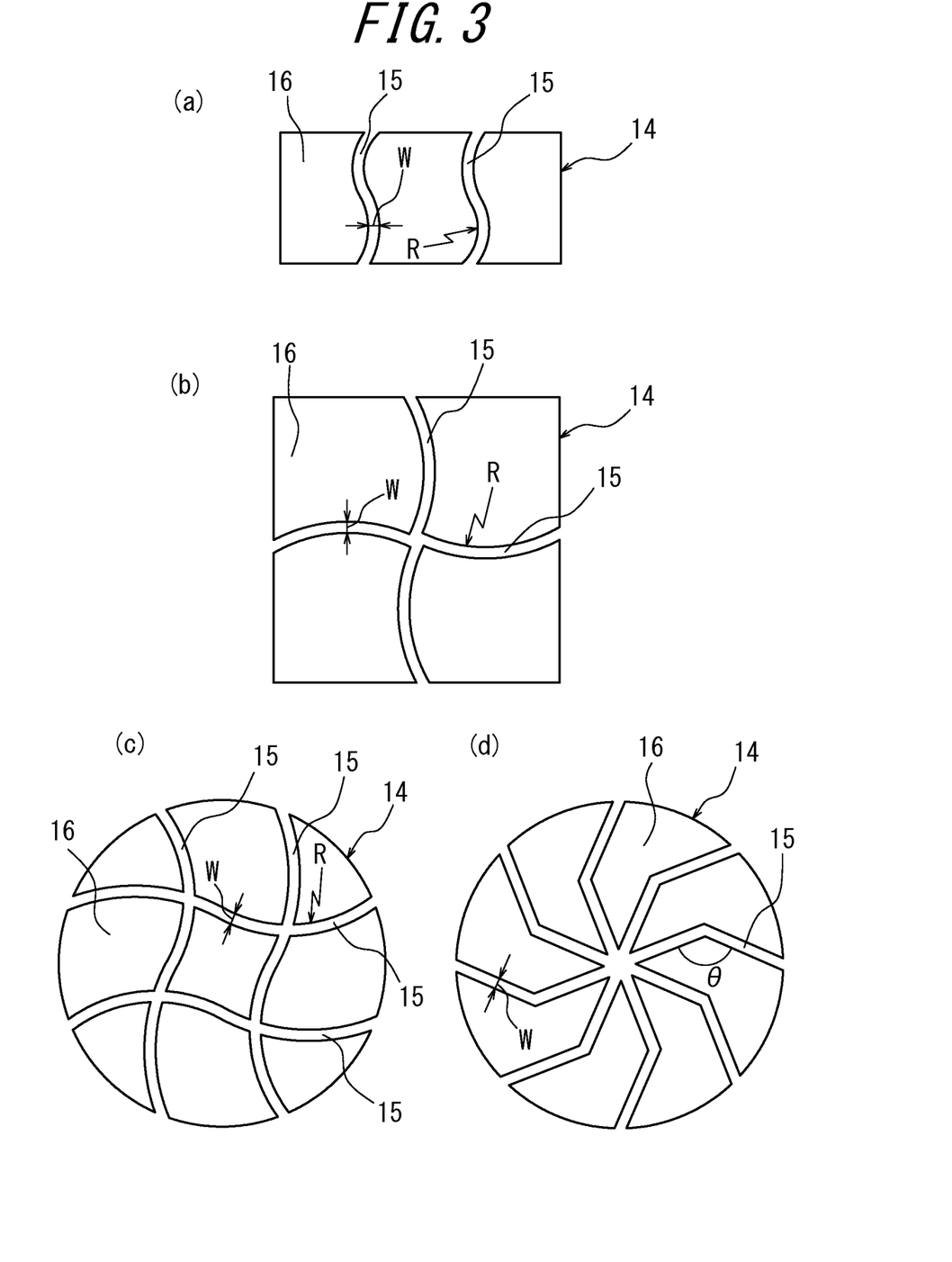
FIGS. 3(a) to 3(d) are diagrams schematically illustrating other formation examples of the through hole and the beams arranged in a synthetic resin portion of the partition member that can be used for the liquid-filled vibration isolating device according to the first aspect of the present invention.

Meanwhile, in the vibration isolating device according to the first aspect of the present invention, as illustrated in FIG. 3(d) which schematically illustrates another formation example of the through hole 14 and the beams 15, the beams 15 may be deflected in a zig-zag manner or the like. Even in such a case, the beams 15 are still encouraged to be deflected in the plane, and therefore capable of preventing changes in high frequency vibration isolation property, generation of abnormal noise due to an elevated liquid pressure, and a breakage due to deformation of the member.

Further, in the vibration isolating device according to the first aspect of the present invention, as in the illustrated example, a thickness dimension d of the beam 15 may preferably be larger than a width dimension W of the beam 15.

With the relation W<d being established, the beams 15 may become further easier to be deflected in the plane while becoming further less likely to be deflected in the thickness direction, which produces, more advantageously, an effect of suppressing change in vibration isolation property of the device according to the present invention.

In addition, in the vibration isolating device according to the first aspect of the present invention, as in the illustrated example, the plurality of windows 16 defined by the beams may preferably be arranged in a circular symmetric manner in the plane.

With the windows 16 being arranged in circular symmetric in the plane, the beams 15 are likely to be uniformly deflected when the membrane support 11 is subjected to compression deformation. Further, the center position of the plurality of windows 16 thus arranged does not change before and after the deflection, which is particularly advantageous when the central portion in the width direction of the membrane 10 is restrained by the central portions of the membrane support 11 and the membrane retainer 12 as in the vibration isolating device illustrated in section in FIG. 2.

Referring to FIGS. 5(a) and 5(b) illustrating a bottom view and a sectional view of a partition member 109 that can be used for the liquid-filled vibration isolating device according to the second aspect of the present invention, the partition member 109 has a membrane 110, a membrane support 111, a membrane retainer 112, and a limit passage 113. The membrane support 111 has a through hole 114 formed therein, and in the illustrated example, the through hole 114 is provided with four beams 115 which linearly extend from the hole edge of the through hole 115 while avoiding the center G of the through hole 114. The beams 115 are each connected to the intermediate portion of the other beam 115 adjacent thereto, to thereby section the through hole into five windows 116, 117.

Although it is unclear from the drawing, the membrane retainer 112 also has a through hole formed therein which is similar to the above-mentioned through hole, and the through hole is sectioned into four small windows by two linear beams which intersect each other. Here, the membrane 110 is formed of a film-like elastic body such as a rubber film or the like, the membrane support 111 is formed of a synthetic resin material, and the membrane retainer 112 is formed of metal.

Further, in the illustrated example, the through hole 114 has a diameter D of φ44, the beams 115 each have a width W of 1.5 mm, and the beams 115 each have a thickness d of 3 mm. Here, W and d satisfy the relation of W<d.

Figure 5:
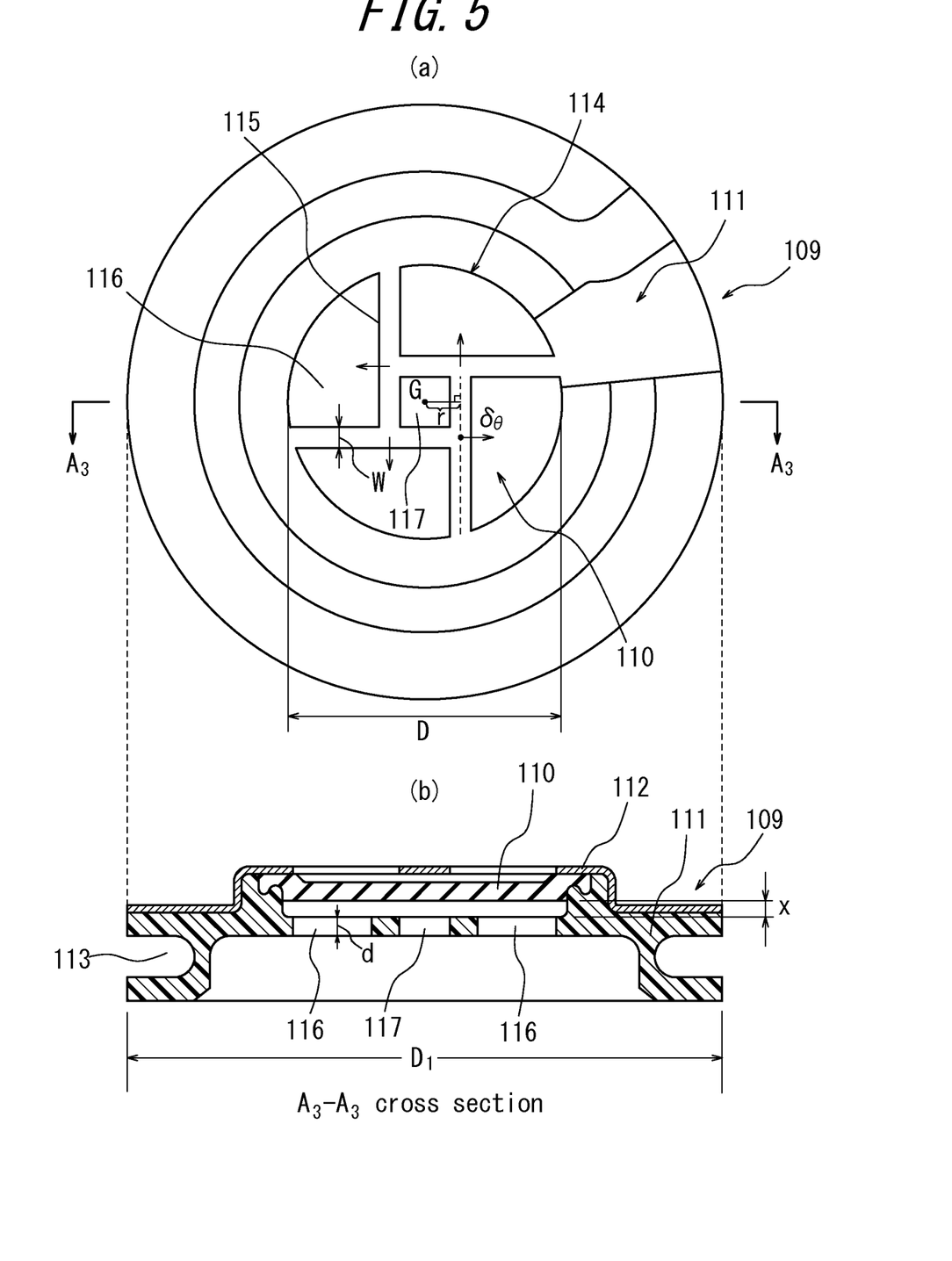
FIG. 5(a) is a bottom view, viewed from the membrane support side, of a partition member that can be used for a liquid-filled vibration isolating device according to a second aspect of the present invention.
FIG. 5(b) is a sectional view taken along the line $A_3$-$A_3$ of the partition member of FIG. 5(a).

The liquid-filled vibration isolating device according to the second aspect of the present invention, to which the above-mentioned partition member 109 is applied, is characterized in that, as illustrated in FIG. 5, three or more (four in the illustrated example) of the beams 115 are provided that extend inside the through hole 114 of at least one of the membrane support 111 and the membrane retainer 112, and the beams 115 are each extended from the hole edge of the through hole 114 while avoiding the center G of the through hole 114 and connected to the intermediate portion of the other beam adjacent thereto, so that the through hole is sectioned into a plurality of (five in the illustrated example) windows 116, 117.

When the beams 115 are provided by the above-mentioned method, the through hole 114 is sectioned into a window 117 (hereinafter, also referred to as center window 117) defined in the center of the through hole 114 by the beams 115 and into windows 116 (hereinafter, also referred to as outside windows 116) defined by two of the beams 115 and the hole edge of the through hole 114 and positioned around the center window 117. The number of the outside windows 16 becomes equal to the number of the beams 115 arranged in the through hole 114. Although not shown, the center window 117 may be filled in with the same material as the beams 115.

With this configuration, when the membrane support 111 of the partition member 109 is deformed inward in the radial direction under an external force such as a swaging force or due to swelling with a liquid filled inside the device, the beams 115 are each applied with a force in a direction of reducing the diameter of the through hole 114 and press the intermediate portion of the other beam 115 adjacent thereto. However, the other beam 115 thus pressed is deflected in the pressing direction, to thereby effectively attenuate a force in the diameter reducing direction. Therefore, the beams 115 are each subjected to deflection deformation in a plane perpendicular to the thickness direction thereof without being deformed in the thickness direction of the partition member 109, with the result that the spacing between each of the beams 115 and the membrane 110 is always kept constant.

In the case where each beam 115 of the partition member 109 illustrated in FIG. 5(a) is subjected to deflection $\delta_\theta$ as described above, the center window 117 positioned in the center of the through hole 114 rotates counterclockwise.

This configuration causes no change in variation amount of the membrane 110 relative to a high frequency vibration input, with the result that the vibration isolation property of the device can be prevented from being changed.

That is, according to the second aspect of the present invention, there can be provided a liquid-filled vibration isolating device capable of preventing deficiencies such as changes in high frequency vibration isolation property, generation of abnormal noise due to an elevated liquid pressure, and a breakage of a component forming the partition member, which otherwise result from an external force such as a swaging force applied to components used for the partition member.

Further, in the vibration isolating device according to the second aspect of the present invention, in view of workability, at least one of the membrane support 111 and the membrane retainer 112 that has the through hole 114 in which the beams 115 are arranged may be formed of a synthetic resin. In this case, the configuration of the present invention is also capable of preventing displacement due to swelling of the component formed of a synthetic resin, which can ensure workability without impairing vibration isolation property of the device.

Further, in the vibration isolating device according to the second aspect of the present invention, as illustrated in the drawing, a thickness dimension d of the beam 115 may preferably be larger than a width dimension W of the beam 115. With the relation W<d being established, the beams 115 may become further easier to be deflected in the plane while becoming further less likely to be deflected in the thickness direction, which produces, more advantageously, an effect of suppressing change in vibration isolation property of the device according to the present invention.

In addition, in the vibration isolating device according to the second aspect of the present invention, as in the illustrated example, the plurality of windows 116, 117 defined by the beams 115 may preferably be arranged in a circular symmetric manner in a plane perpendicular to the thickness direction of the partition member 109.

With the windows 116, 117 being arranged in circular symmetric in the plane, the beams 115 are likely to be uniformly deflected when the membrane support 111 is subjected to compression deformation. In this case, the window 117 rotates about the center G of the through hole 114 without being changed in its position. Therefore, there occurs no significant change in area of any of the windows 116, 117, and hence changes in vibration isolation property of the device, which otherwise result from the significant change in area of the windows 116 and 117, can be prevented from being caused.

Still further, in the vibration isolating device according to the second aspect of the present invention, the beams are each formed in a curved or deflected shape in a plane perpendicular to the thickness direction of the partition member to thereby allow the beams to be easily deflected in the plane, so that deformation of the beams in the diameter reducing direction can be absorbed more easily. As a result, deformation of the membrane support in the radially inward direction resulting from swaging or the like can be absorbed through the deformation of the beams, without changing the distance x between the membrane and the membrane support. Specifically, with this configuration, when the membrane support of the partition member is deformed inward in the radial direction, each beam, which is also subjected to a force in a compressing direction, undergoes deflection deformation in a plane perpendicular to the thickness direction thereof without being deflected in the thickness direction thereof because each beam is configured as a curved shape. As a result, the spacing between the membrane and the membrane support is always kept constant.

Further, the second aspect of the present invention can be suitably applied to a case where the through hole 114 in which the beams 115 are arranged is circular in shape as in the illustrated example. With the through hole 114 being circular in shape, the hole edge of the through hole 114 is likely to be uniformly displaced in the diameter reducing direction when the partition member 109 is deformed, and hence, for example, the windows 116, 117 can be prevented from undergoing non-uniform change in area before and after the deformation, with the result that changes in vibration isolation property resulting from the non-uniform change in area of the windows 116, 117 can be effectively suppressed.

In addition, in the vibration isolating device according to the second aspect of the present invention, a perpendicular from the center G of the through hole 114 to a center line in the width direction of the beam 115 has a length r falling within the range of 2 to 5 times the width dimension W of each of the beams 115, to thereby produce a deformation prevention effect while retaining the initial characteristics at the same time. Specifically, when the length r is equal to or more than five times the width dimension W, the center of the membrane 110 cannot be held down, which may lead to deterioration of the initial characteristics. On the other hand, when the length r is equal to or less than two times the width dimension W, the beam 115 may become less likely to deflect and therefore cannot sufficiently attenuate a force in the diameter reducing direction, which may lead to a fear that the characteristic of the device is significantly changed due to element deformation.

BEST MODES FOR CARRYING OUT THE INVENTION

In the following, the present invention is described in detail with reference to the drawings.

Figure 2:
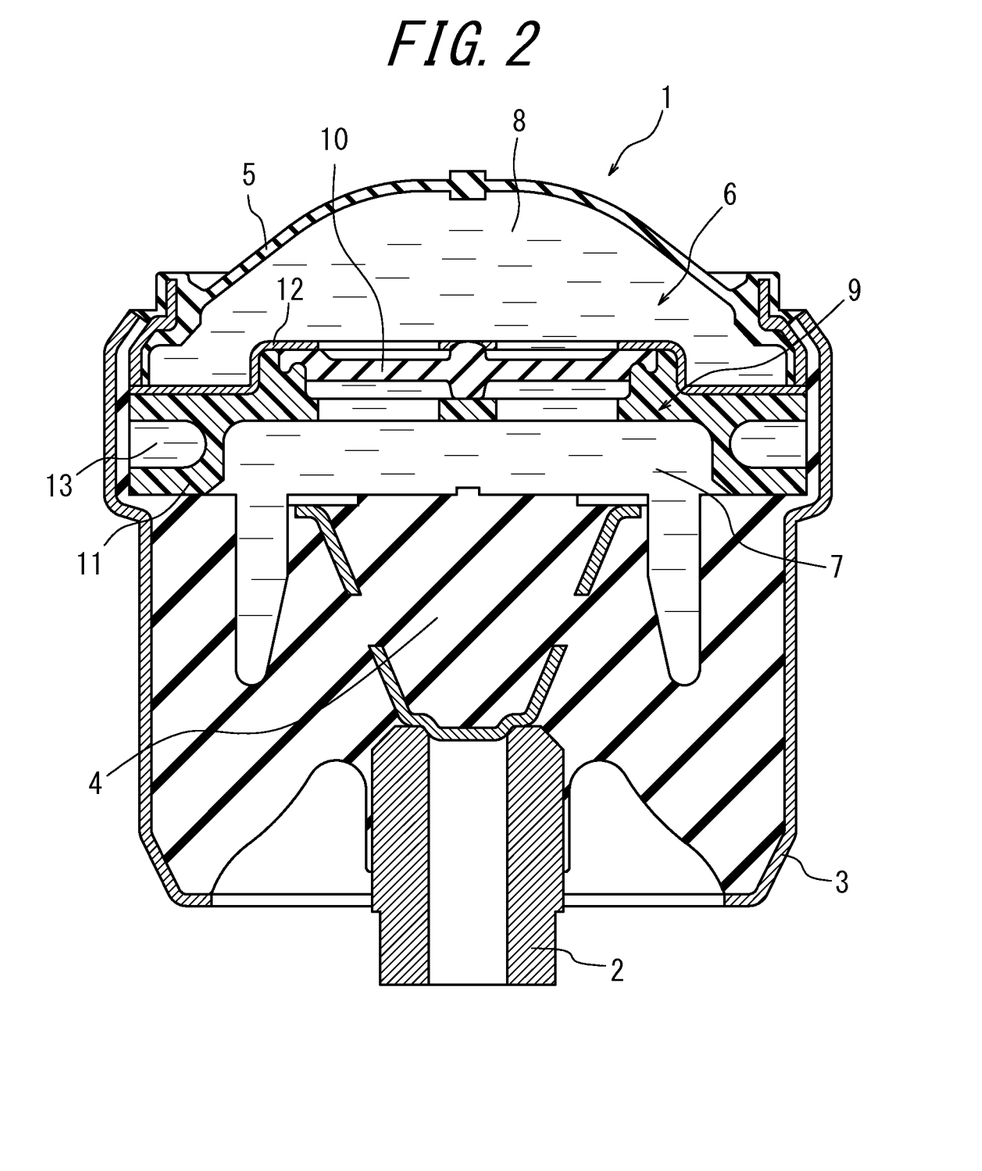
FIG. 2 is a longitudinal sectional view illustrating an embodiment of the liquid-filled vibration isolating device according to the first aspect of the present invention.

In an embodiment of a vibration isolating device according to a first aspect of the present invention illustrated in FIG. 2, a liquid-filled vibration isolating device 1 includes: a core member 2 to be connected to one of a vibration generating body and a vibration transmitting body; a cylindrical member 3 to be connected to the other one of the body; an elastic member 4 connecting the cylindrical member 3 at one end thereof to the outer periphery of the core member 2 in a fluid-tight manner; a diaphragm 5 attached to the other end of the cylindrical member 3 in a fluid-tight manner; a fluid chamber 6 configured as a space defined inside the diaphragm 5, the space being filled with an incompressible liquid; and a partition member 9 partitioning the fluid chamber 6 into a primary liquid chamber 7 on the core member 2 side and a secondary liquid chamber 8 on the diaphragm 5 side.

Figure 1:
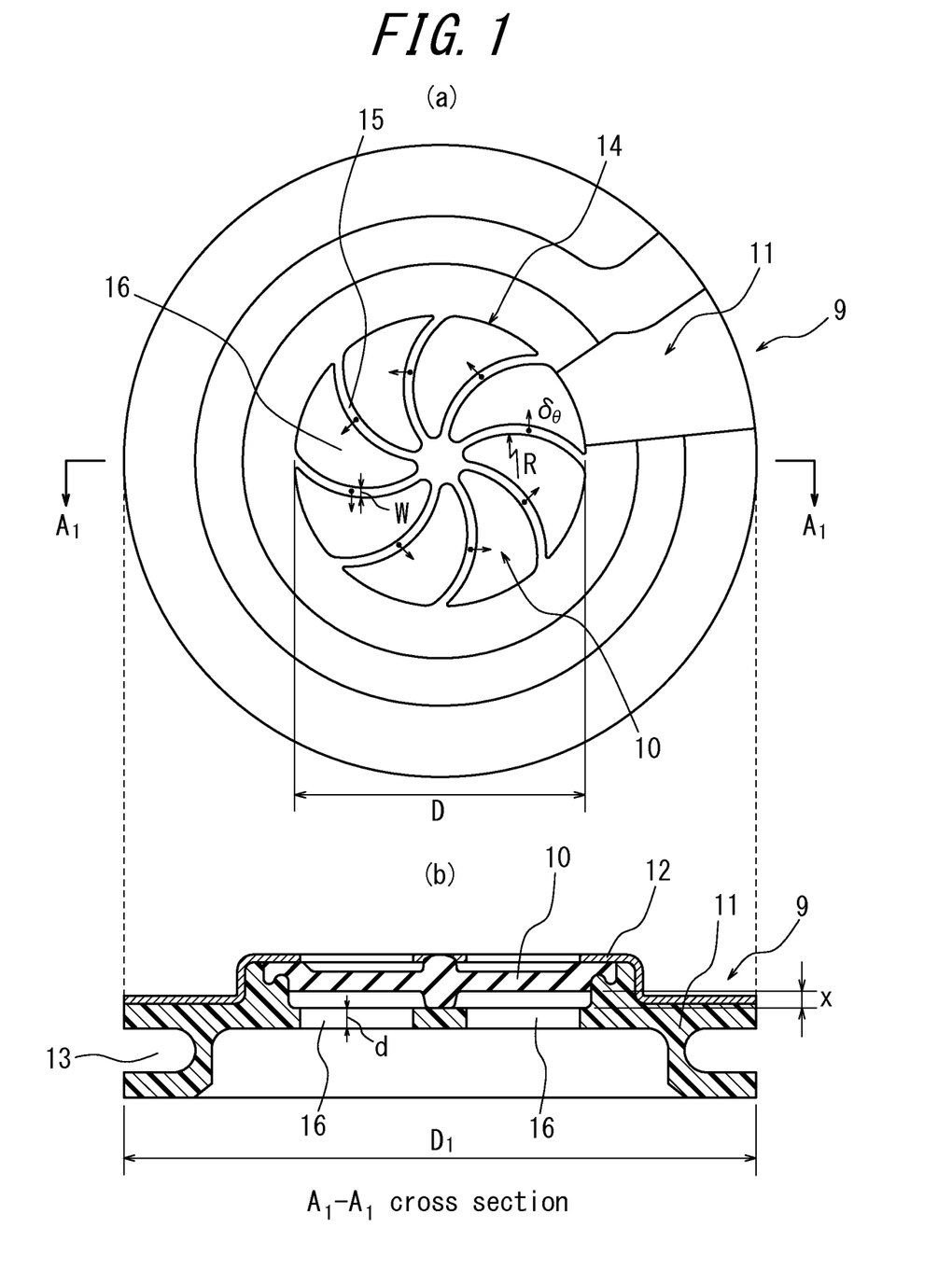
FIG. 1(a) is a bottom view, viewed from a membrane support side, of a partition member that can be used for a liquid-filled vibration isolating device according to a first aspect of the present invention.
FIG. 1(b) is a sectional view taken along the line $A_1$-$A_1$ of the partition member of FIG. 1(a).

The partition member 9 is identical with the partition member 9 of FIG. 1 described above. In the illustrated example, the periphery of the partition member 9 is tight-fixed by the elastic member 4 and the cylindrical member 3, so as to restrain the partition member 9 from being deformed in the diameter increasing direction.

The partition member 9 has the beams 15 arranged in the through hole 14 formed in one of the membrane support 11 and the membrane retainer 12. In FIGS. 1 and 2, the through hole 14 is formed in the membrane support 11. Here, it is essential that the beams 15 arranged in the through hole 14 are each in a curved shape in a plane perpendicular to the thickness direction of the partition member 9.

Alternatively, in this case, the plurality of beams 15 may be arranged so as to be curved in opposite directions to one another.

As illustrated in FIG. 1, the beams 15 are each curved in an arc-like shape with a curvature radius R in the above-mentioned plane. Eight of the beams 15 are arranged side by side in a circular symmetric manner around a center point corresponding to the center of the through hole 14.

Further, the beams 15 each have a width W and a thickness D satisfying W<d. Here, although not particularly limited, the beams 15 each may preferably have the width W of about 1 to 3 mm and the thickness d of about 2 to 6 mm.

In FIG. 1, only the through hole 14 of the membrane support 11 is sectioned by the beams 15 which are curved or deflected in the above-mentioned plane. However, according to the present invention, it is merely necessary that at least one of the membrane support 11 and the membrane retainer 12 has a through hole sectioned by beams curved or deflected in the above-mentioned plane. Therefore, for example, the membrane support 11 may have a through hole sectioned by linear beams while the membrane retainer 12 has a through hole sectioned by beams curved or deflected in the above-mentioned plane. Further, the membrane support 11 and the membrane retainer 12 both may have through holes sectioned similarly to each other.

In this case, at least one of the membrane support 11 and the membrane retainer 12 each having a through hole sectioned by beams curved or deflected in the above-mentioned plane may be formed of a synthetic resin, so as to suppress deformation resulting from swelling of the synthetic resin while providing easiness in workability.

Further, in the present invention, the through hole 14 formed in a synthetic resin portion may be in any shape. The present invention is also applicable to a hole in a polygonal shape such as a rectangular shape as illustrated in FIGS. 3(a) and 3(b), in addition to the circular hole as exemplified above.

The arrangement of the beams 15 in the through hole 14 is not particularly limited, and the beams 15 may be arranged in parallel as illustrated in FIG. 3(a), may be intersected crosswise as illustrated in FIG. 3(b), or may arranged in a grid pattern as illustrated in FIG. 3(c).

Figure 6:
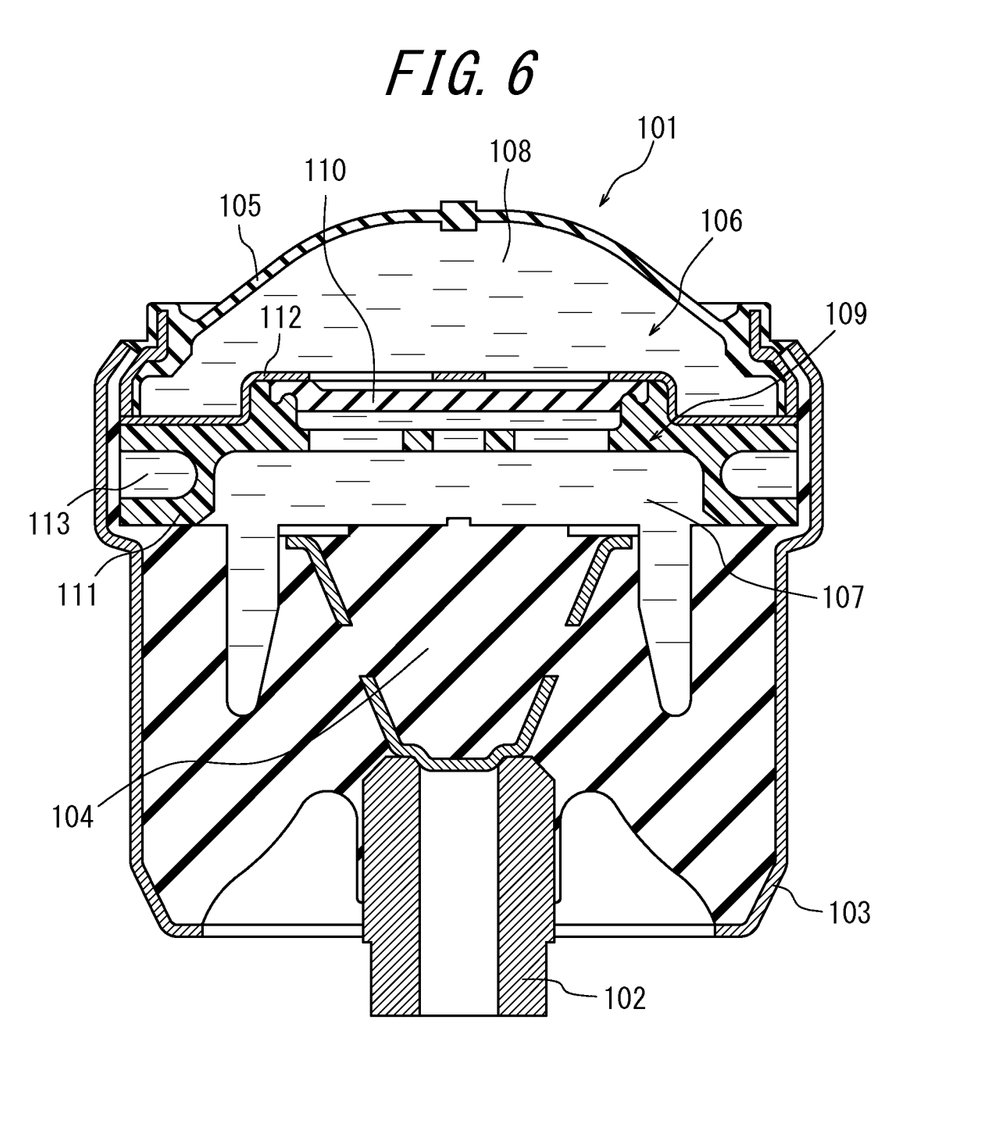
FIG. 6 is a longitudinal sectional view illustrating an embodiment of the liquid-filled vibration isolating device according to the second aspect of the present invention.

In an embodiment of a vibration isolating device according to a second aspect of the present invention illustrated in FIG. 6, a liquid-filled vibration isolating device 101 includes: a core member 102 to be connected to one of a vibration generating body and a vibration transmitting body; a cylindrical member 103 connected to the other one of the body; an elastic member 104 connecting the cylindrical member 103 at one end thereof to the outer periphery of the core member 102 in a fluid-tight manner; a diaphragm 105 attached to the other end of the cylindrical member 103 in a fluid-tight manner; a fluid chamber 106 configured as a space defined inside the diaphragm 105, the space being filled with an incompressible liquid; a partition member 109 partitioning the fluid chamber 106 into a primary liquid chamber 107 on the core member 102 side and a secondary liquid chamber 108 on the diaphragm 105 side.

The partition member 109 is identical with the partition member 109 of FIG. 5 described above. In the illustrated example, the periphery of the partition member 109 is tight-fixed by the elastic member 104 and the cylindrical member 103, so as to restrain the partition member 109 from being deformed in the diameter increasing direction.

The partition member 109 has a through hole 114 formed in one of the membrane support 111 and the membrane retainer 112. In FIGS. 5 and 6, the through hole 114 is formed in the membrane support 111, and three or more beams 115 are provided that extend in the through hole 114. Here, it is essential that each beam 115 is extended from the hole edge of the through hole 114 while avoiding the center G of the through hole 114 and connected to the intermediate portion of the other beam 115 adjacent thereto, thereby sectioning the through hole 114 into a plurality of windows 116, 117.

Alternatively, in this case, each beam 115 may be connected to any of the other adjacent beams on both sides. Although not particularly limited, the beams 15 each may preferably have the width W of about 1 to 3 mm and the thickness d of about 2 to 6 mm.

According to the present invention, it is merely necessary that at least one of the membrane support 111 and the membrane retainer 112 has a through hole sectioned by the above-mentioned three or more beams. Therefore, for example, only the through hole of the membrane retainer 112 may be sectioned by the above-mentioned method. Further, the membrane support 111 and the membrane retainer 112 both may have through holes sectioned similarly to each other.

Further, in the present invention, the through hole 114 may be in any shape. The present invention is also applicable to a hole in a polygonal shape such as a rectangular shape as illustrated in FIG. 9(a), in addition to the circular hole as exemplified above.

Figure 7:
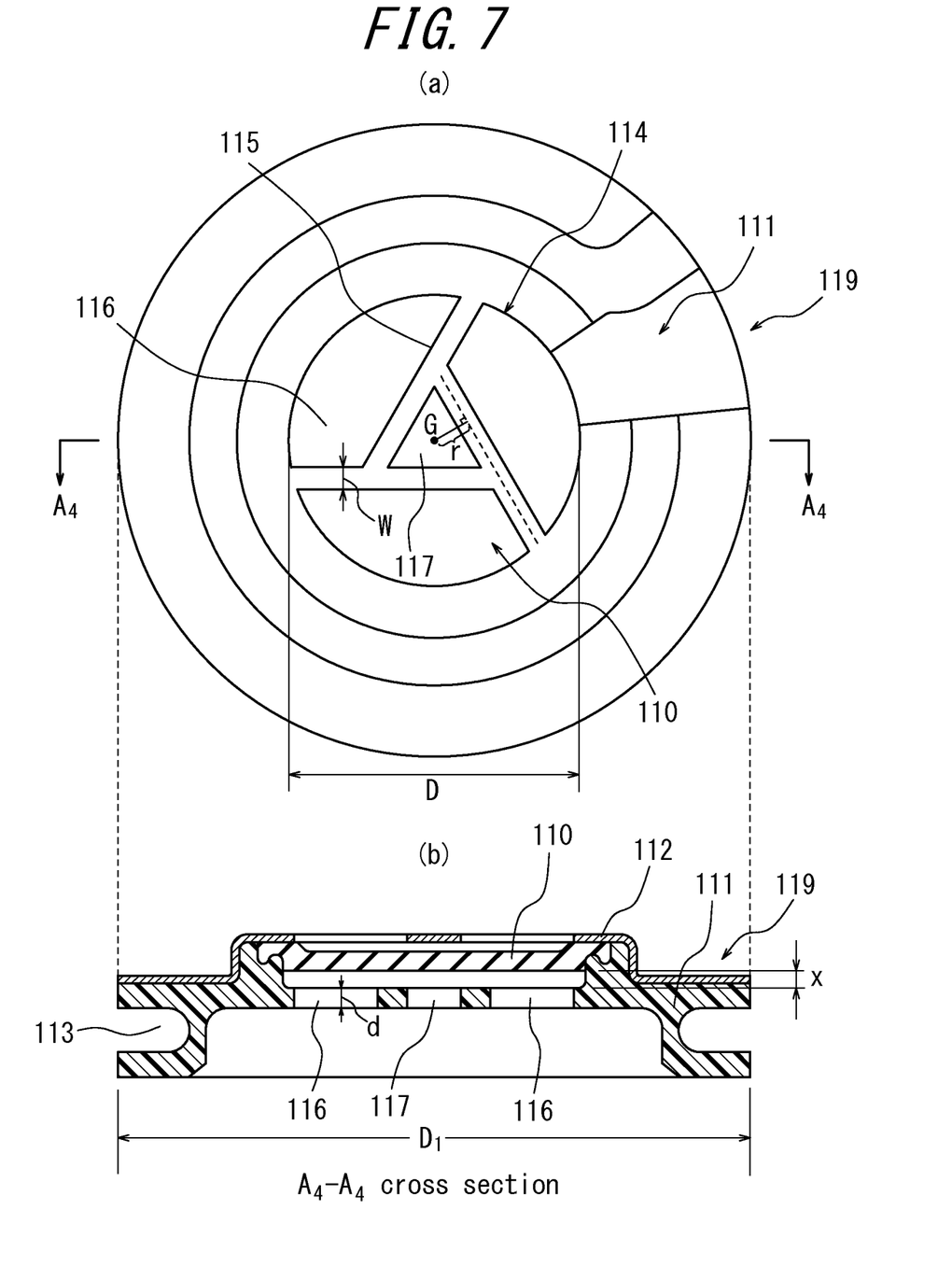
FIG. 7(a) is a bottom view, viewed from the membrane support side, of another partition member that can be used for the liquid-filled vibration isolating device according to the second aspect of the present invention.
FIG. 7(b) is a sectional view taken along the line $A_4$-$A_4$ of the partition member of FIG. 7(a).
Figure 9:
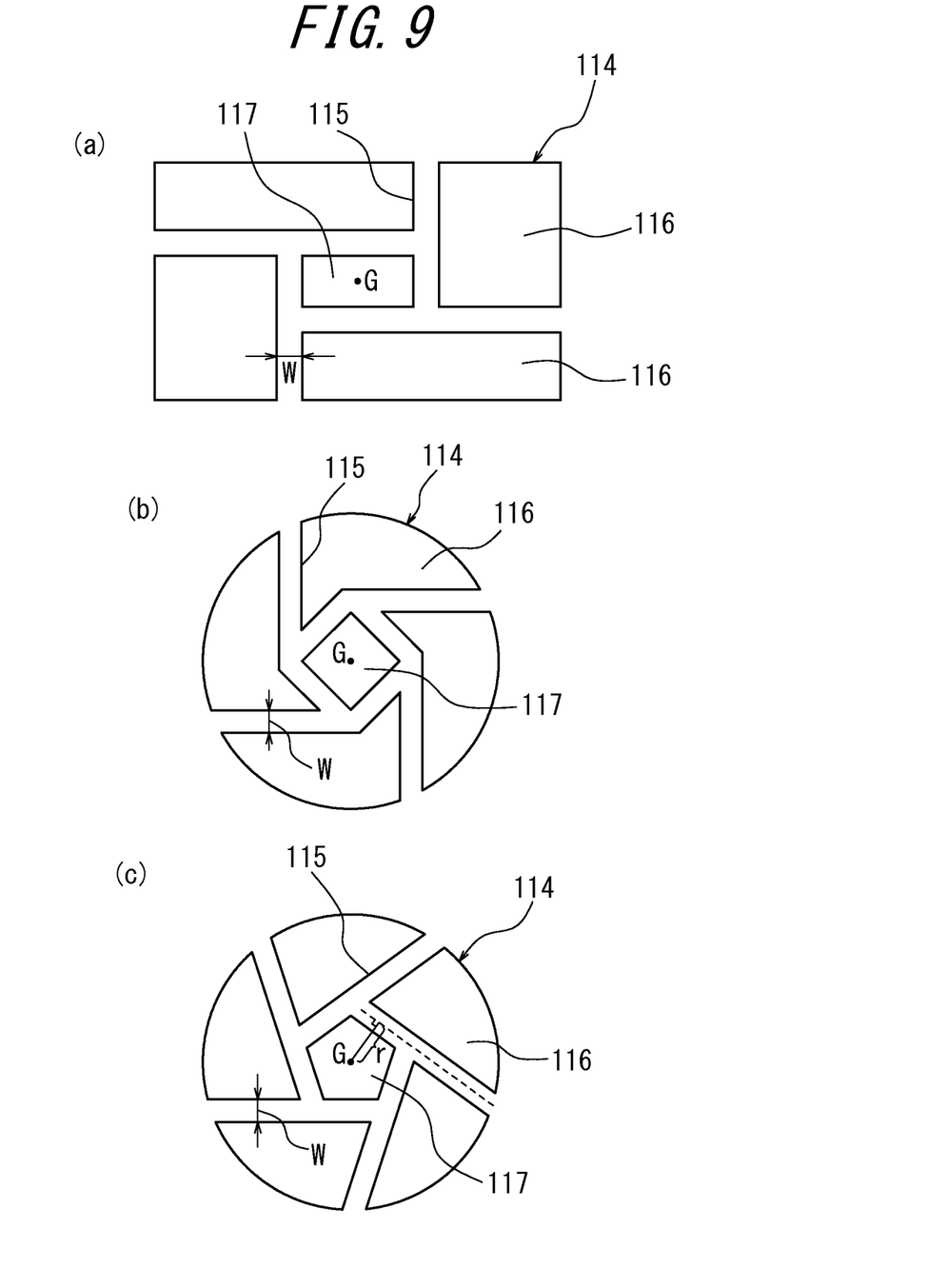
FIGS. 9(a) to 9(c) are diagrams each schematically illustrating other formation examples of the through hole and the beams arranged in a synthetic resin portion of the partition member that can be used for the liquid-filled vibration isolating device according to a second aspect of the present invention.

Further, according to the present invention, it is sufficient that three or more of the beams 115 are arranged in the through hole 114, and the through hole 114 may be sectioned by three of the beams 115 as illustrated in FIG. 7, or may be sectioned by five of the beams 115 as illustrated in FIG. 9(c).

Figure 8:
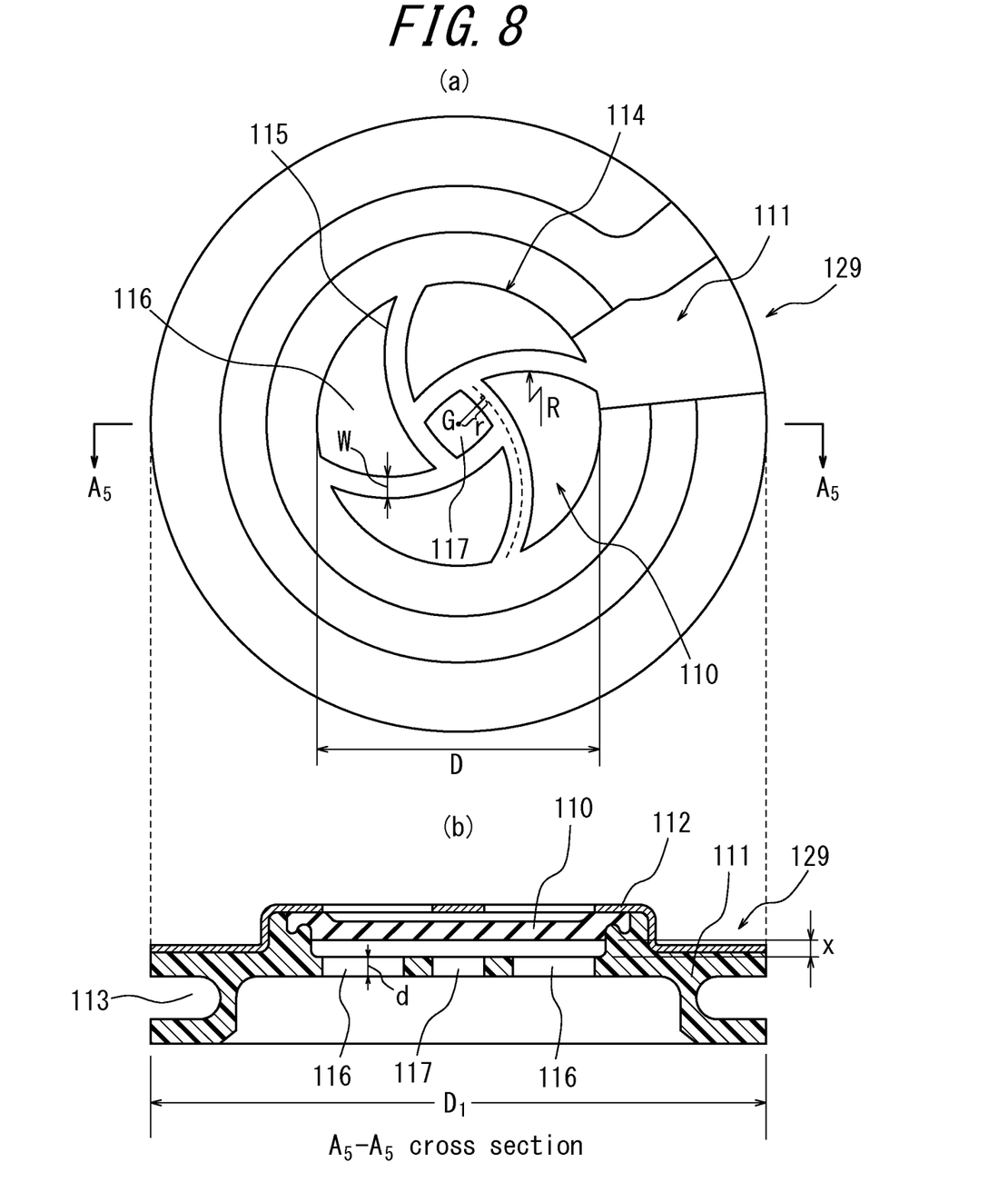
FIG. 8(a) is a bottom view, viewed from the membrane support side, of further another partition member that can be used for the liquid-filled vibration isolating device according to the second aspect of the present invention.
FIG. 8(b) is a sectional view taken along the line $A_5$-$A_5$ of the partition member of FIG. 8(a).

At this time, the beam 115 may be provided as being curved at a curvature radius R in a plane perpendicular to the thickness direction of the partition member 129 as illustrated in FIG. 8(a), or may be provided as being deflected in the plane as illustrated in FIG. 9(b), in addition to being formed in a linear shape as illustrated in FIG. 5.

In this case, at least one of the membrane support 111 and the membrane retainer 112 each having a through hole sectioned by beams curved or deflected in the above-mentioned plane may be formed of a synthetic resin, so as to suppress deformation resulting from swelling of the synthetic resin while providing easiness in workability.

The partition member 129 illustrated in FIGS. 8(a) and 8(b) is similar to the partition member 109 of FIG. 5, except in that the beams 115 are curved. The beams 115 are thus provided as being curved as described above, to thereby make it easier to deflect the beams 115 in a desired direction.

EXAMPLES

Example 1

Figure 4:
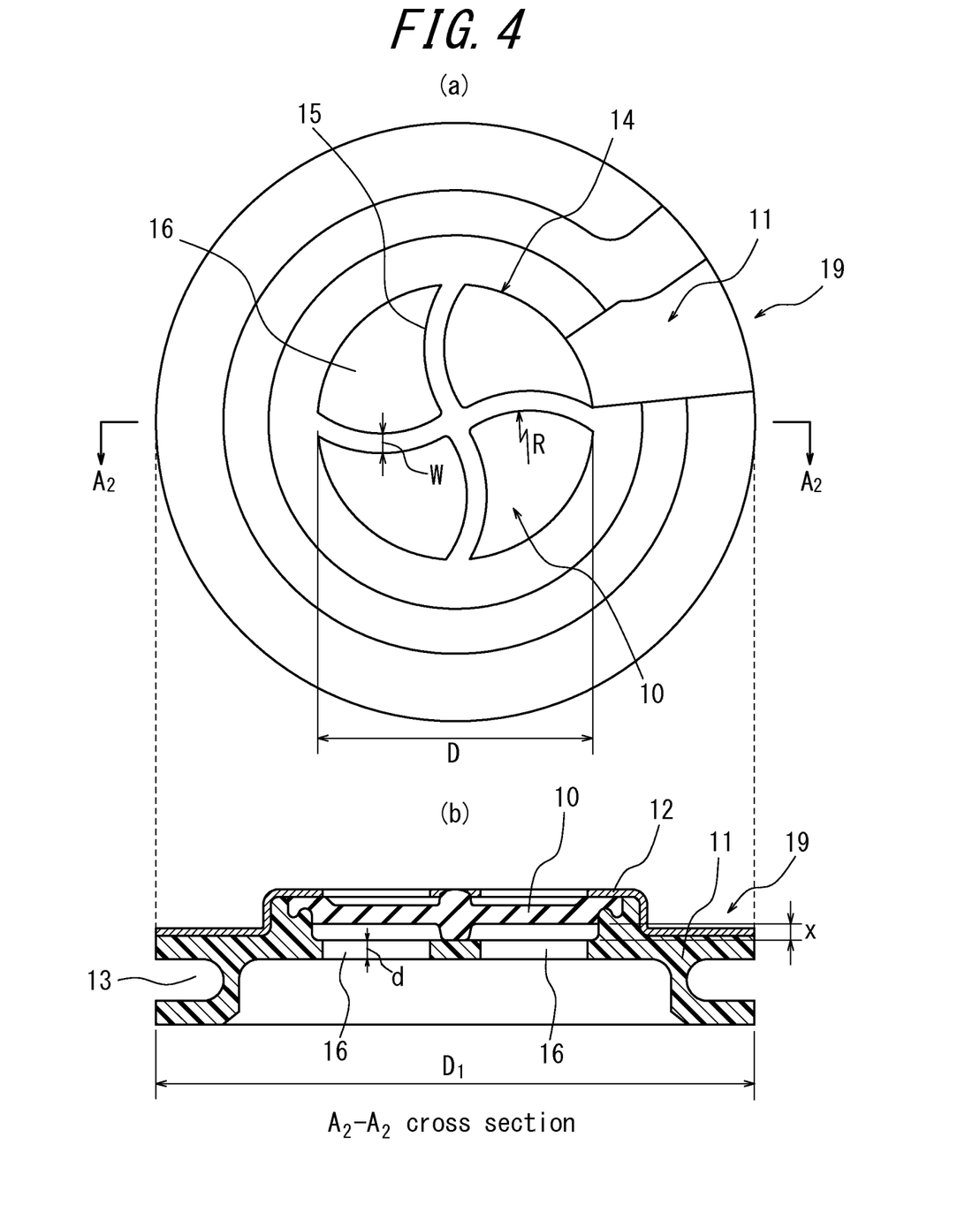
FIG. 4(a) is a bottom view, viewed from the membrane support side, of another partition member that can be used for the liquid-filled vibration isolating device according to the first aspect of the present invention.
FIG. 4(b) is a sectional view taken along the line $A_2$-$A_2$ of the partition member of FIG. 4(a).

The partition member 19 illustrated in FIGS. 4(a) and 4(b) is similar to the partition member 9 of FIG. 1, except in that four beams 15 each being curved in an arc-like shape are provided as being arranged at regular intervals in a plane perpendicular to the thickness direction of the partition member, to thereby section the through hole 10 into four windows 16 which are congruent to one another.

Figure 10:
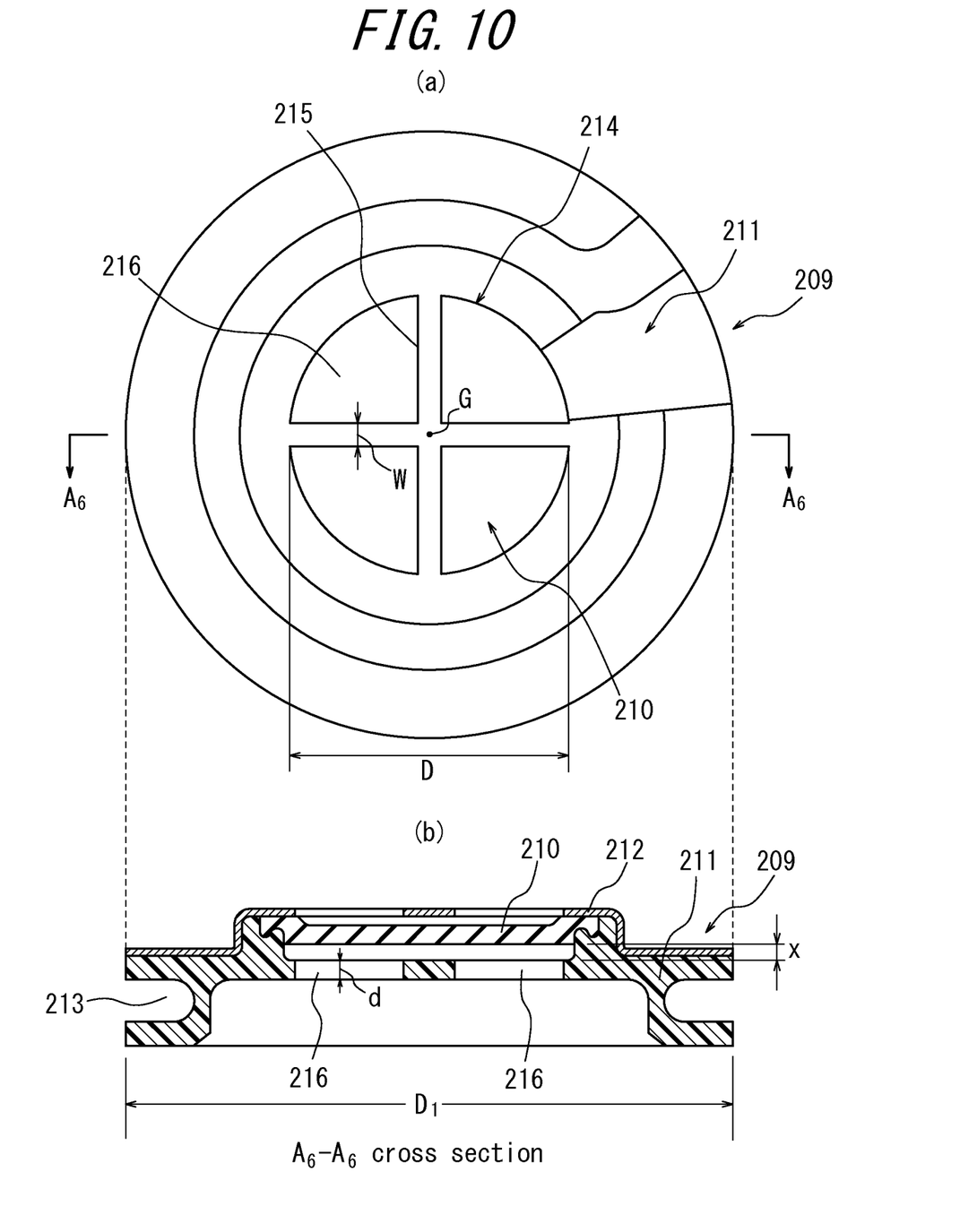
FIG. 10(a) is a bottom view, viewed from the membrane support side, of a partition member of a conventional example.
FIG. 10(b) is a sectional view taken along the line $A_6$-$A_6$ of the partition member of FIG. 10(a).

Further, the partition member 209 illustrated in FIGS. 10(a) and 10(B) has two linear beams 215 which linearly extend and intersect each other at right angle at the center of the through hole 210 so that the through hole 210 is sectioned into four windows 216 which are congruent to one another.

With reference to FIGS. 4(a) and 4(b), models of the partition member 19 of the vibration isolating device according to the first aspect of the present invention were prepared. At this time, two models were prepared which were different from each other in thickness d and width W of the beam 15 as shown in Table 1, and the models were provided as Examples 1 and 2. The beam 15 had a curvature radius R of 15 mm.

Similarly, with reference to FIGS. 10(a) and 10(b), two models of the partition member 209 were prepared which were different from each other in thickness d and width W of the beam 215 as shown in Table 1, and the models were provided as Conventional Examples 1 and 2. It should be noted that Examples 1 and 2 and Conventional Examples 1 and 2 each had a through hole with a diameter D of φ44.

The models of Conventional Examples and Examples thus provided were subjected to measurement for obtaining the maximum amount of change in distance between the membrane and the membrane retainer that occurs when the membrane support was caused to swell by 3% under the restraint condition where the shape and size of the membrane retainer and the maximum diameter of the partition member were fixed, and the maximum amount thus measured was indexed, with a score of 100 representing Conventional Example 1. Table 1 shows the results thereof.

TABLE 1

|  | Conventional Example 1 | Conventional Example 2 | Example 1 | Example 2 |
|---|---|---|---|---|
| Curvature Radius R (mm) | — | — | 13 | 13 |
| Beam Thickness d (mm) | 2.5 | 5 | 2.5 | 5 |
| Beam Width W (mm) | 5 | 2.5 | 5 | 2.5 |
| Maximum Amount (%) of Change in Distance between Membrane and Membrane Retainer | 100 | 55 | 63 | 46 |

As shown in Table 1, when there is no difference in beam thickness d and beam width W, the maximum amount of change in distance between the membrane and the membrane retainer of Example 1 or 2 of the present invention is smaller than that of Conventional Example 1 or 2. Further, comparison of the results obtained for Example 1 and Example 2 indicates that the maximum amount of change in distance can further be reduced when the beam thickness d is larger than the beam width W (W<d).

Based on the above-mentioned results, it can be said that the liquid-filled vibration isolating device of the present invention is capable of effectively suppressing displacement of the component part of the partition member that occurs when the partition member is subjected to external force such as swaging force, and displacement resulting from swelling of the material.

Example 2

With reference to FIGS. 5(a) and 5(b), models of the partition member 109 of the vibration isolating device according to the second aspect of the present invention were prepared. At this time, two models were prepared which were different from each other in thickness d and width W of the beam 115 as shown in Table 2, and the models were provided as Examples 3 and 4. The beams 115 are provided while avoiding the center G of the through hole 114 so that a perpendicular from the center G of the through hole 114 to the center line in the width direction of each of the beams 115 has a length r of 7.5 mm.

The partition member 209 illustrated in FIGS. 10(a) and 10(b) has two linear beams 215 which linearly extend and intersect each other at a right angle at the center G of the through hole 210, so that the through hole 210 is sectioned into four windows 216 which are congruent to one another.

Similarly, with reference to FIGS. 10(a) and 10(b), two models of the partition member 209 were prepared which were different from each other in thickness d and width W of the beam 215 as shown in Table 2, and the models were provided as Conventional Examples 1 and 2. It should be noted that Examples 3 and 4 and Conventional Examples 1 and 2 each had a through hole with a diameter D of φ44.

The models of Conventional Examples and Examples thus provided were subjected to measurement for obtaining the maximum amount of change in distance x between the membrane and the membrane retainer that occurs when the membrane support was caused to swell by 3% under the restraint condition where the shape and size of the membrane retainer and the maximum diameter of the partition member were fixed, and the maximum amount thus measured was indexed, with a score of 100 representing Conventional Example 1. Table 2 shows the results thereof.

TABLE 2

|  | Conventional Example 1 | Conventional Example 2 | Example 3 | Example 4 |
|---|---|---|---|---|
| Through Hole Diameter D (mm) | φ 44 | | | |
| Beam Thickness d (mm) | 2.5 | 5 | 2.5 | 5 |
| Beam Width W (mm) | 5 | 2.5 | 5 | 2.5 |
| Maximum Amount (%) of Change in Distance between Membrane and Membrane Retainer | 100 | 55 | 82 | 50 |

As shown in Table 2, when there is no difference in beam thickness d and beam width W, the maximum amount of change in distance between the membrane and the membrane retainer of Example 3 or 4 of the present invention is smaller than that of Conventional Example 1 or 2. Further, comparison of the results obtained for Example 3 and Example 4 indicates that the maximum amount of change in distance can further be reduced when the beam thickness d is larger than the beam width W (W<d).

Based on the above-mentioned results, it can be said that the liquid-filled vibration isolating device of the present invention is capable of effectively suppressing displacement of the component of the partition member that occurs when the partition member is subjected to an external force such as a swaging force, and displacement resulting from swelling of the material.

DESCRIPTION OF SYMBOLS 1, 101 vibration isolating device
2, 102 core member
3, 103 cylindrical member
4, 104 elastic member
5, 105 diaphragm
6, 106 fluid chamber
7, 107 primary liquid chamber
8, 108 secondary liquid chamber
9, 19, 109, 119, 129 partition member
10, 110 membrane
11, 111 membrane support
12, 112 membrane retainer
13, 113 limit passage
14, 114 through hole
15, 115 beam
16, 116 window
D through hole diameter
R beam curvature radius
W beam width
d beam thickness
$\delta_\theta$ deflection

The invention claimed is:

1. A liquid-filled vibration isolating device, comprising:
a core member to be connected to one of a vibration generating body and a vibration transmitting body;
a cylindrical member to be connected to the other body;
an elastic member connecting the cylindrical member at one end thereof to the outer periphery of the core member in a fluid-tight manner;
a diaphragm attached to the other end of the cylindrical member in a fluid-tight manner;
a fluid chamber configured as a space defined inside the diaphragm, the space being filled with an incompressible liquid; and
a partition member partitioning the fluid chamber into a primary liquid chamber on the core member side and a secondary liquid chamber on the diaphragm side,
the partition member having a membrane, a membrane support supporting the membrane, a membrane retainer for restricting, in cooperation with the membrane support, a deformation amount or a displacement amount of the membrane, and a limit passage communicating the primary liquid chamber with the secondary liquid chamber,
the membrane support and the membrane retainer each having a through hole penetrating therethrough in a direction toward the primary and secondary liquid chambers, respectively,
wherein at least one of the membrane support and the membrane retainer has the through hole sectioned into a plurality of windows by one or more beams each having a curved or deflected shape in a plane perpendicular to the thickness direction of the partition member, wherein the one or more beams each has a first portion and a second portion, wherein the first portion extends to a hole edge of the through hole and said first potion has a curved or deflected shape extending from the hole edge in the circumferential direction about a central axis of the partition member, and wherein the second portion is circumferentially offset about the central axis from the first portion.

2. The liquid-filled vibration isolating device according to claim 1, wherein the at least one of the membrane support and the membrane retainer that has the through hole sectioned into a plurality of windows by one or more beams each having a curved or deflected shape in a plane perpendicular to the thickness direction of the partition member is formed of a synthetic resin.

3. The liquid-filled vibration isolating device according to claim 1, wherein the through hole in which the beams are arranged is circular in shape.

4. The liquid-filled vibration isolating device according to claim 3, wherein the beams are each curved in an arc-like shape in the plane, and the arc has a curvature radius R which is 0.5 to 2.0 times the radius D/2 of the through hole.

5. The liquid-filled vibration isolating device according to claim 1, wherein the beams are each configured to have a beam thickness dimension d larger than a beam width dimension W.

6. The liquid-filled vibration isolating device according to claim 1, wherein the plurality of windows defined by the beams are arranged in a circular symmetric manner in the plane.

* * * * *